United States Patent
Qian et al.

(10) Patent No.: US 9,083,615 B2
(45) Date of Patent: *Jul. 14, 2015

(54) DIAGNOSING NETWORK PROBLEMS IN AN IPV6 DUAL STACK NETWORK

(71) Applicant: AT&T Intellectual Property I, L.P., Atlanta, GA (US)

(72) Inventors: Zhiqang Qian, Holmdel, NJ (US); Paritosh Bajpay, Edison, NJ (US); Jackson K. Liu, Middletown, NJ (US); Michael John Zinnikas, North Brunswick, NJ (US)

(73) Assignee: AT&T Intellectaul Property I, L.P., Atlanta, GA (US)

( * ) Notice: Subject to any disclaimer, the term of this patent is extended or adjusted under 35 U.S.C. 154(b) by 135 days.

This patent is subject to a terminal disclaimer.

(21) Appl. No.: 13/900,022

(22) Filed: May 22, 2013

(65) Prior Publication Data

US 2013/0286857 A1  Oct. 31, 2013

Related U.S. Application Data

(63) Continuation of application No. 13/019,637, filed on Feb. 2, 2011, now Pat. No. 8,457,006, which is a continuation of application No. 12/323,050, filed on Nov. 25, 2008, now Pat. No. 7,903,569.

(51) Int. Cl.
*G06F 11/00* (2006.01)
*H04L 12/26* (2006.01)
*H04L 12/24* (2006.01)
(Continued)

(52) U.S. Cl.
CPC ........ *H04L 43/0823* (2013.01); *H04L 41/0686* (2013.01); *H04L 43/0817* (2013.01); *H04L 61/6086* (2013.01); *H04L 69/161* (2013.01); *H04L 69/16* (2013.01)

(58) Field of Classification Search
USPC .............. 370/241, 242–246, 250, 252, 395.1, 370/395.5–395.52
See application file for complete search history.

(56) References Cited

U.S. PATENT DOCUMENTS 6,654,914 B1  11/2003  Kaffine et al.
7,305,466 B1  12/2007  Kaffine et al.
(Continued)

FOREIGN PATENT DOCUMENTS

WO  2007033542 A1  3/2007

OTHER PUBLICATIONS

Venaas et al, Initial IPv4 to IPv6 transition cookbook for end site networks/universities, 6net, 75 pages, Dec. 2002.
(Continued)

*Primary Examiner* — Frank Duong
(74) *Attorney, Agent, or Firm* — Hoffmann & Baron, LLP

(57) ABSTRACT

Embodiments of the present invention are directed to diagnosing problems in a dual stack network supporting Internet Protocol Version Six (IPV6). Inventoried information can be retrieved from an inventory system in response to a problem associated the dual stack network. It can be determined whether a mismatch exists between live customer address information associated with a customer edge router and the inventoried information. A notification can be generated in response to determining whether a mismatch exists. The notification includes information representing a cause of the problem and resolution of the problem.

20 Claims, 4 Drawing Sheets

(51) Int. Cl.
*H04L 29/12* (2006.01)
*H04L 29/06* (2006.01)

(56) References Cited

U.S. PATENT DOCUMENTS

| | | |
|---|---|---|
| 7,673,061 B2 | 3/2010 | Nubani et al. |
| 2007/0233887 A1* | 10/2007 | Nubani et al. ............... 709/230 |
| 2007/0263545 A1 | 11/2007 | Foster et al. |
| 2008/0075114 A1 | 3/2008 | Mo |
| 2008/0159153 A1 | 7/2008 | Bajpay et al. |

OTHER PUBLICATIONS

R. Gilligan, E. Nordmark, "Transition Mechanisms for IPv6 Hosts and Routers," Internet Engineering Task Force (IETF), Request for Comments: 1933 (Apr. 1996).

* cited by examiner

DIAGNOSING NETWORK PROBLEMS IN AN IPV6 DUAL STACK NETWORK

CROSS REFERENCE TO RELATED APPLICATIONS

This application is a continuation of co-pending U.S. patent application Ser. No. 13/019,637, filed on Feb. 2, 2011, which is a continuation of U.S. patent application Ser. No. 12/323,050, filed on Nov. 25, 2008, each of which is incorporated herein by reference in its entirety.

BACKGROUND

1. Field

The present invention relates to diagnosing problems occurring in a dual stack network configured to support IPV6.

2. Brief Discussion of Related Art

Conventional service provider networks generally include routers, such as edge routers and core routers, which route information from an originating source to a destination. Customers can connect to the service provider network by connecting to a provider edge (PE) router.

Internet Protocol Version Six (IPV6) is the latest Internet protocol to be established and offers several advantages over the previous Internet protocol, Internet Protocol Version Four (IPV4), such as an increased addressing range. Service providers have been transitioning from IPV4 to IPV6 using several approaches. In one approach, service providers are implementing IPV4 and IPV6 concurrent. To achieve this, the service providers are implementing dual stack technology that allows IPV6 and IPV4 capability to co-exist in their provider edge routers, where such routers can translate data being sent or received from one protocol version to the other.

Many problems can occur in IPV6 networks, which can be burdensome and time consuming to isolate and diagnose. When some IPV6 failures occur, the customer's network can still be active, but the customer can lose some or all of their services. To resolve these failures, the service provider must find the root cause of the failure quickly to minimize downtime experienced by the customer and to mitigate the impact of the failure on customer services.

It, therefore, is desired to automatically diagnose problems in IPV6 networks and to notify an operator of the type and/or location of the problem.

SUMMARY

The preferred embodiments of the present invention automatically diagnose problems associated with a dual stack network capable of supporting both Internet Protocol Version Four (IPV4) and Internet Protocol Version Six (IPV6). Embodiments of the present invention eliminate or reduce network downtime experienced by customers and can reduce the time and labor required of an operator to find, diagnose, and resolve the problem.

Embodiments disclosed herein are directed to a computer-implemented method of diagnosing problems in a dual stack network supporting Internet Protocol Version Six (IPV6). The method includes retrieving inventoried information from an inventory system in response to a problem associated the dual stack network and determining whether a mismatch exists between live customer address information associated with a customer edge router and the inventoried information. The live customer address information includes a live Internet protocol (IP) address, a live customer source Media Access Control (MAC) address, and a live customer destination MAC address. The method also includes generating a notification in response to determining whether a mismatch exists. The notification includes information representing a cause of the problem and resolution of the problem.

Embodiments disclosed herein are directed to a computer readable medium holding instructions, wherein execution of the instructions by at least one computing device implements a method for diagnosing problems in a dual stack network supporting Internet Protocol Version Six (IPV6). The method implemented by the execution of the instructions includes retrieving inventoried information from an inventory system in response to a problem associated the dual stack network and determining whether a mismatch exists between live customer address information associated with a customer edge router and the inventoried information. The live customer address information includes a live Internet protocol (IP) address, a live customer source Media Access Control (MAC) address, and a live customer destination MAC address. The method also includes generating a notification in response to determining whether a mismatch exists, where the notification includes information representing a cause of the problem and resolution of the problem.

Embodiments disclosed herein are directed to a system for diagnosing problems in a dual stack network supporting Internet Protocol Version Six (IPV6). The system includes a computing system formed by one or more computing devices. The computing system is configured to implement a diagnostic engine to retrieve inventoried information from an inventory system in response to a problem associated with the dual stack network, determine whether a mismatch exists between live customer address information associated with a customer edge routed and the inventoried information, and to generate a notification in response to determining whether a mismatch exists. The notification includes information representing a cause of the problem and resolution of the problem. The live customer address information includes a live Internet protocol (IP) address, a live customer source Media Access Control (MAC) address, and a live customer destination MAC address.

In some embodiments, a port status of a port on a live provider edge (PE) router associated with the customer edge router can be checked to determine whether the port is active. If the port is inactive, Layer 1 and Layer 2 diagnostics can be performed. If the port is active, a live IP address and network subnet mask associated with the port on the live PE router can be retrieved.

In some embodiment, policy information implemented by a live provider edge (PE) router can be retrieved. The policy information can include a packet count limit. It can be determined whether a packet transmitted by the customer edge router exceeds the packet count limit. A notification identifying a bandwidth problem can be generated in response to the packet exceeding the packet count limit. Otherwise a ping test can be performed from the PE router to the customer edge router with maximum transfer unit (MTU) packets and the ping test results can be checked. If the ping test is successful, a notification can be generated to indicate that no problem was found in the dual stack network and an inventoried customer MAC address can be retrieved based on a customer IPV6 address to locate customer equipment that has failed in response to a failure of the ping test. The customer IPV6 address from the PE router.

In some embodiments, the live customer source MAC address can be retrieved from a mac-address-table maintained by a provider edge (PE) router associated with the customer edge router.

In some embodiments, the inventoried information is provisioned by a service provider when a customer network is set up and remains unchanged unless there is a change to a service agreement between the service provider and a customer associated with the customer network.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

Embodiments of the present invention include a diagnostic engine that allows a service provider to automatically diagnose problems in a dual stack network that supports Internet Protocol Version Six (IPV6) using dual IP layer devices. IPV6 is defined by the Internet Engineering Task Force (IETF). A dual stack is defined by Request For Comments (RFC) 1933 provided by the IETF and refers to a node, such as a router, in a network that is configured to support both Internet Protocol Version Four (IPV4) and IPV6. Problems in an IPV6 network can include, but are not limited to configuration errors, network congestion, translation errors, and the like. The diagnostic engine can preferably access information associated with routers in the network and can use this information to diagnose a problem in the network. When the diagnostic engine determines that a problem exists, a notification can be generated that identifies the type and/or location of the problem. Based on this notification an operator can quickly and readily resolve the problem.

The preferred embodiments enable service providers to detect and diagnose problems quickly to eliminate or reduce the network downtime experienced by a customer when a problem occurs. In some cases, the preferred embodiments may detect, diagnose, and resolve the problem before the customer becomes aware of the problem. In addition, the preferred embodiments can reduce the time and labor required of an operator to find, diagnose, and resolve the problem. This allows the service provider to provide a high quality of service while reducing costs associated with network maintenance.

Figure 1:
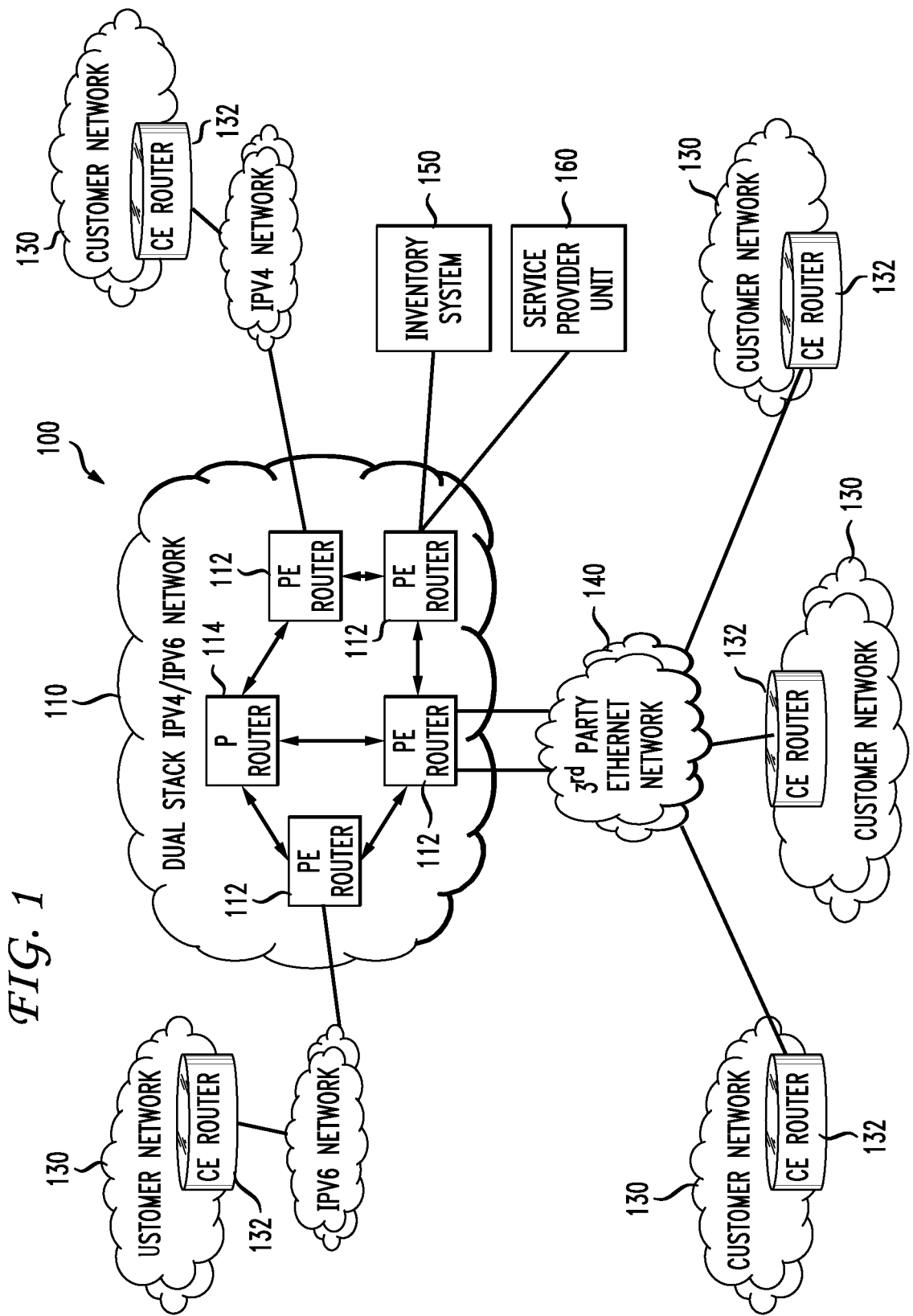
FIG. 1 shows an exemplary network in which the preferred embodiments of the present invention can be implemented.

FIG. 1 shows an exemplary dual stack network architecture 100 (hereinafter "network 100") in accordance with the preferred embodiments of the present invention. The network 100 includes a service provider network 110, customer networks 130, and a third party network 140. The service provider network can include provide edge (PE) routers 112 and provider routers 114. The PE routers 112 are on the periphery of the service provider network 110 and allow other devices, such customer edge routers, or networks, such as customer networks or third party networks, to connect to the service provider network 110. Information can be routed through the service provider network 110 from an originating source PE router to a destination PE router. The provider routers 114 form an interior of the service provider network 110 and can link the PE routers 112 of the service provider network 110 to provide routes over which information can be transmitted between the originating source and the destination.

In some embodiments, the PE routers 112 can be configured as dual IP layer devices capable of implementing a dual stack for supporting both IPV4 and IPV6. In some embodiments, the interior of the service provider network 110 is implemented using IPV6. For these embodiments, data packets received using IPV4 are mapped to IPV6 and routed through the service provider network 110 as IPV6 traffic. Mapping between IPV4 data packets and IPV6 data packets is required because IPV4 and IPV6 are incompatible. As a result, a customer network operating with IPV4 cannot communicate with a customer network operating IPV6 unless the data packets are converted from one protocol version to the other.

The customer networks 130 preferably include one or more customer edge (CE) routers 132, which are also referred to herein as access routers. The CE routers 132 facilitate communication with the service provider network 110 by communicatively coupling to the PE routers 112, where such communicative coupling can be through the third part network 140. The CE routers 132 can be implemented as dual IP layer devices configured to implemented a dual stack to support both IPV4 and IPV6. CE routers 132 the customer networks 130 are assigned an IPV4 compliant Internet protocol (IP) address, and IPV6 compliant IP address, and can also have an associated Media Access Control (MAC) address. In some embodiments, CE routers 132 can be configured for IPV4, IPV6, or both IPV4 and IPV6.

Routers (e.g., CE routers and PE routers) can include configuration information, such as network policies, virtual routing and forwarding (VRF) tables to direct traffic through the network 100, IP addresses, and the like. Policies governor the interaction between the customer network and the service provider network. Some examples of policies that can be implemented include limiting a size of packets that can be transmitted over the network, limiting the access speed available to the customer networks 130, and the like. Some of these policies can be defined in a customer service agreement between the service provider and customer.

A service provider can maintain an inventory system 150, which is a database or storage system that maintains inventory information about the network and the network nodes (e.g., PE routers, provider routers, and CE routers) including information associated with the customer and information associated with service provider information. Some examples of customer information maintained by the inventory system includes configuration information (e.g., IP addresses of CE routers, MAC addresses of CE routers), policies, circuit identification (ID) unique to each customer assigned by the service provider to indicate service levels including access speed, and the like. Some information maintained by the inventory system can be associated with the service provider network, such as network topology information, configuration information including addresses of the PE router 112 and the provider routers 114, policies, VRFs, and the like. Some, all, or none of the inventory information in the inventory system is static. The inventory information is information specified for each customer network when the customer network is set up and typically does not change unless there is, for example, a change in the agreement between the service provider and the customer. As such, the inventory system represents an expected implementation of the network 100.

A service provider unit 160 can be used by the service provider to implement the diagnostic engine. The service provider unit 160 can communicate with devices connected in the network 100 to allow the diagnostic engine to implement tests and gather information from the devices connected in the network 100.

Figure 2:
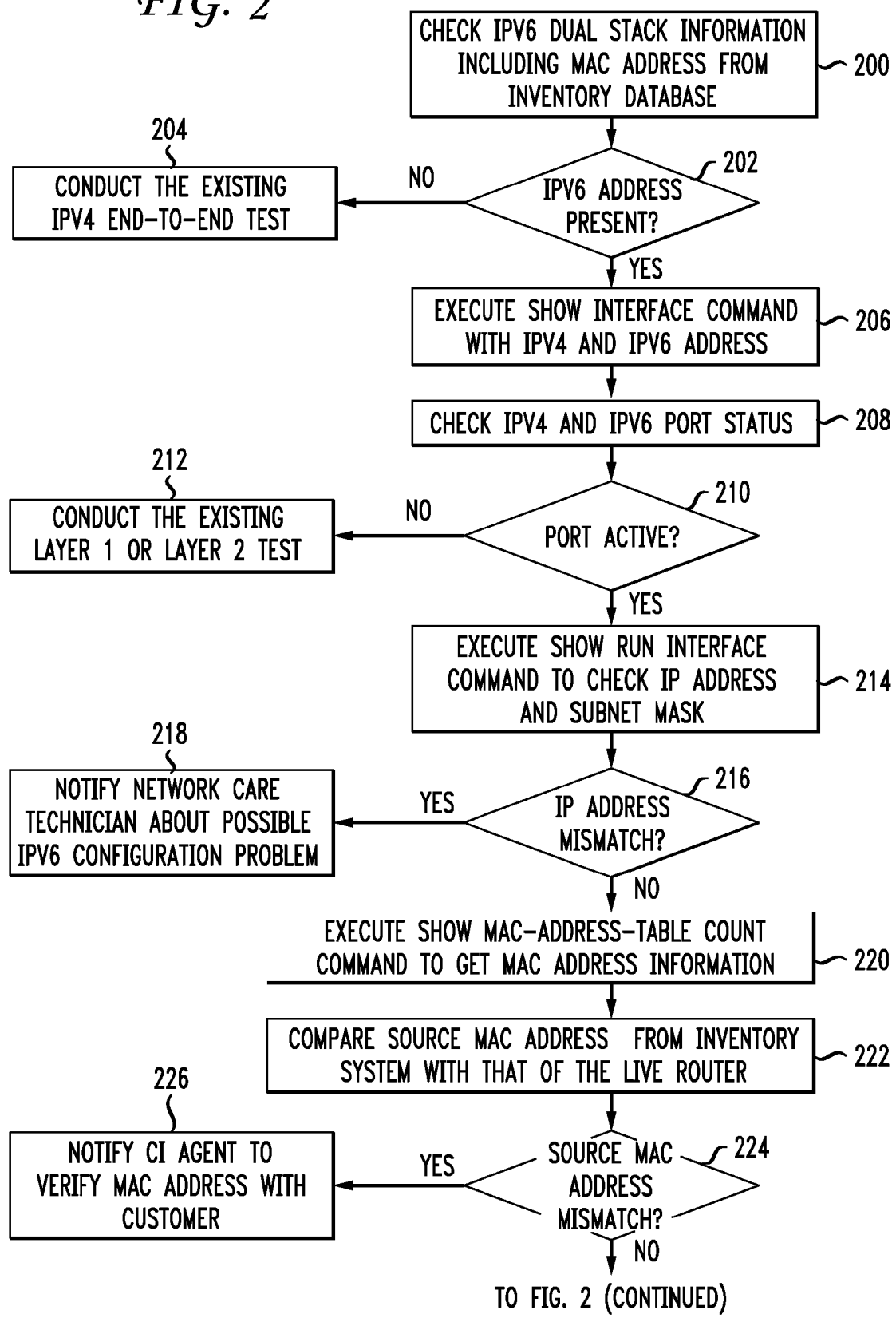
FIG. 2 is a flow chart that shows automatic diagnosis of problems in an IPV6 dual stack network.
Figure 2:
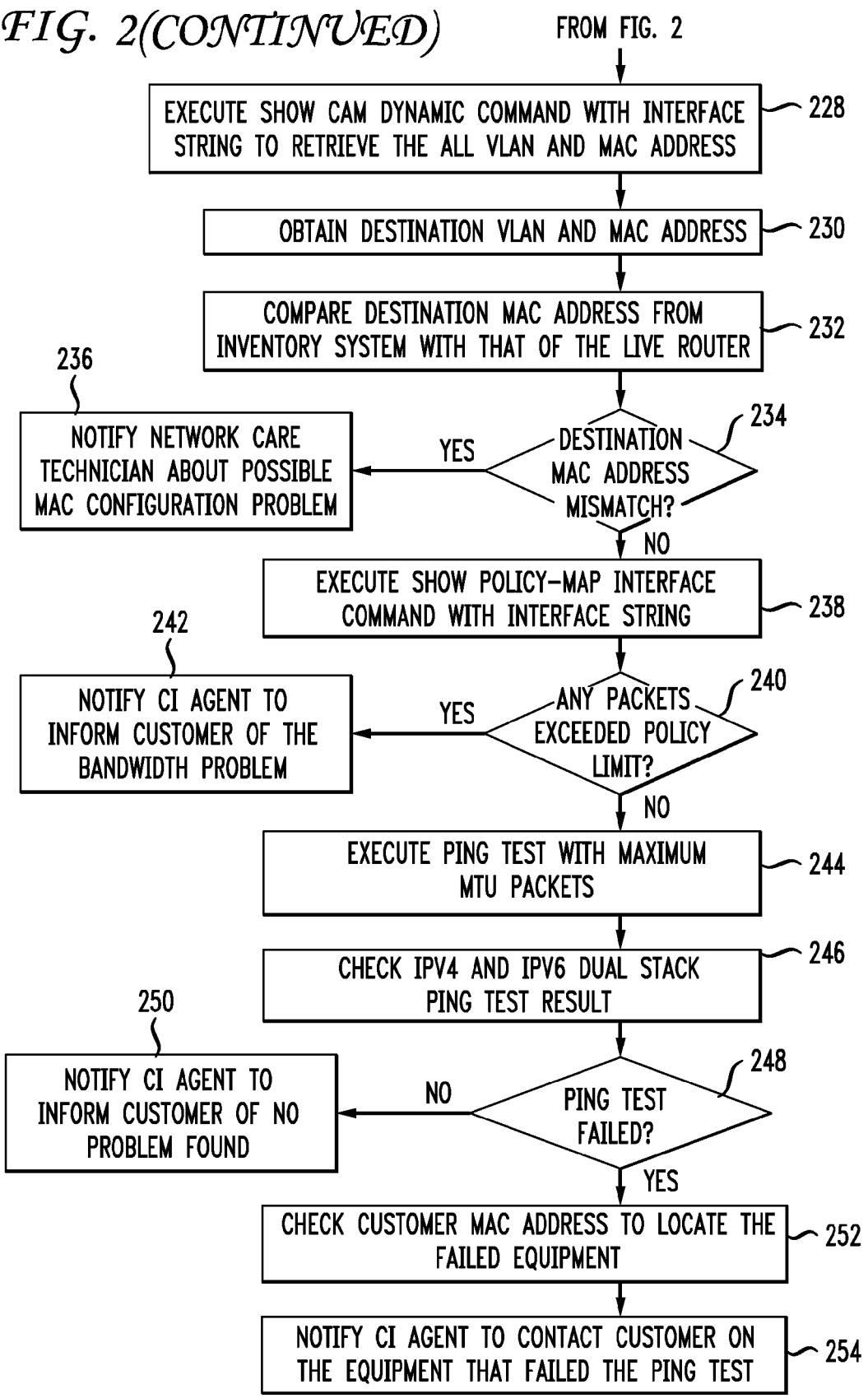

FIG. 2 is a flowchart showing a programmatic diagnosis of problems in a dual stack network that is performed by a diagnostic engine in accordance with embodiments of the present invention. Initially, a trouble ticket or other mechanism for indicating a problem in the network can be generated. In response to the trouble ticket, the diagnostic engine obtains a live MAC address associated with a CE router from the trouble ticket. This represents 'live' information associated with the network. As used herein, "live" information refers to information in the network that the network nodes (e.g., routers) can use during operation of the network.

Subsequently, the diagnostic engine retrieves dual stack information including the 'inventoried' MAC address associated a CE router, from the inventory system (step 200). As used herein, "inventoried" or "inventory" information refers to information that is stored by the inventory system as reference information initially provisioned by the service provider when the customer network is created. The diagnostic engine checks the dual stack information in the inventory system to determine whether an inventoried IPV6 address (i.e., an IPV6 compliant IP address) exists for the inventoried MAC address (step 202). This allows the diagnostic engine to determine whether the customer network that is experiencing a problem is configured to use IPV4 or dual stack. If no IPV6 address exists for the inventoried MAC address (202), the diagnostic engine determines that the problem is associated with the IPV4 and continues diagnosing the problem by performing an existing IPV4 end-to-end network testing (step 204).

Otherwise, the diagnostic engine determines that a dual stack is implemented by executing a command, such as a show interface command to retrieve the live port status and provisioning data from the live PE router, using the IPV4 and IPV6 address associated with the CE router (step 206). A port is an interface on a router to which other devices, such as routers can connect and port status refers to a status of the port's operation. The diagnostic engine checks the status of the port of the PE router associated with the CE router to determine whether a link and/or protocol is up or down between the PE router and the CE router (step 208). If the port is inactive (i.e., down) (step 210), the diagnostics engine continues by conducting existing Layer 1 and/or Layer 2 testing (step 212). Layer 1 refers to the physical layer of a network including physical connections between device using wires, optical fiber, or wireless technologies including satellite and radio frequency communication. Layer 2 refers to a data link or logical layer of a network that is built on the physical layer (i.e. Layer 1) of the network. Layer 2 of a network can be used to implement protocols, such as Ethernet, Asynchronous Transfer Mode (ATM), Frame Relay, and the like. Otherwise, the diagnostic engine checks the live IP address and network subnet mask associated with the port on the PE router using a command, such as the show run interface command to retrieve such IPV6 data from the live PE router (step 214). This command allows the diagnostics engine to identify the live information including customer subnet mask, the customer IP address (IPV4 and IPV6), CE router IP address, the virtual routing table name, and the like.

The live customer IP address is compared to the inventoried customer IP address provisioned by the service provider and stored in the inventory system. If there is an IP address mismatch between the live customer IP address and the inventoried customer IP address (step 216), the diagnostic engine generates a notification that there is a possible IPV6 configuration error (step 218). A mismatch refers to a difference between the inventoried information and the live information. The notification can be sent to a technician who can review the results of the diagnostic engine and proceed to resolve the problem associated with the impacted customer. Otherwise, the diagnostic engine executes a command to get the live Mac address information from a mac-address-table in the live PE router, such as a show mac-address-table count command (step 220). The mac-address-table includes source and destination MAC addresses associated with customer edge routers. The live MAC address information can be retrieved from the PE router and can include a source MAC address associated with the CE router and a destination MAC address associated with the live PE router. The live source MAC address associated with the CE router is retrieved from the PE router implemented in the network and is compared to a corresponding inventoried source MAC address in the inventory system (step 222). If there is a mismatch between the live source MAC address and the inventoried source MAC address (step 224), the diagnostic engine generates a notification requesting verification of MAC addresses (step 226).

If there is no mismatch between the live MAC address and the inventoried source MAC address (step 224), the diagnostic engine executes a command, such as the show cam dynamic command with interface string to retrieve live destination VLAN and MAC address from the PE router (step 228). Subsequently, the diagnostics engine obtains the live destination virtual local area network (VLAN) and destination MAC address (step 230) and compares the inventoried destination MAC address from the inventory system to the live destination MAC address of the PE router (step 232). If there is a mismatch between the live destination MAC address and the inventoried destination MAC address (step 234), the diagnostic engine generates a notification to inform a technician that there is a possible MAC configuration problem (step 236).

Otherwise, the diagnostic engine executes a show policy map interface command with interface string to retrieve policies implemented by the live PE router, such as packet count limits (step 238). A packet count limit refers to a policy that limits a size of the packets that can be transmitted using the service provider network. If any packet exceeded the policy limit (step 240), the diagnostic engine generates a notification identifying a bandwidth problem so that a customer interface agent can inform the customer (step 242). If no packets exceeded the policy limit (step 240), the diagnostic engine performs a ping test with maximum transfer unit (MTU) packets (i.e., packets having a size equal to the maximum size specified in the policy) from the live PE router to the source customer edge router (step 244) and checks the IPV4 and IPV6 dual stack ping test results (step 246). A ping test refers to sending a test signal from a PE router to a customer edge router and waiting for the customer edge router to respond to the test signal by sending an acknowledgement or other signal, such as the test signal, back to the PE router. In the event that the ping test is successful (step 248), a notification is generated indicating that no problem was found (step 250). If the ping test fails (step 248), the diagnostic engine checks the customer MAC address based on the customer IPV6 address to locate the customer equipment that has failed (step 252) and a notification is generated to instruct that an attempt to contact the customer on the equipment that failed the ping test can be made (step 254).

Figure 3:
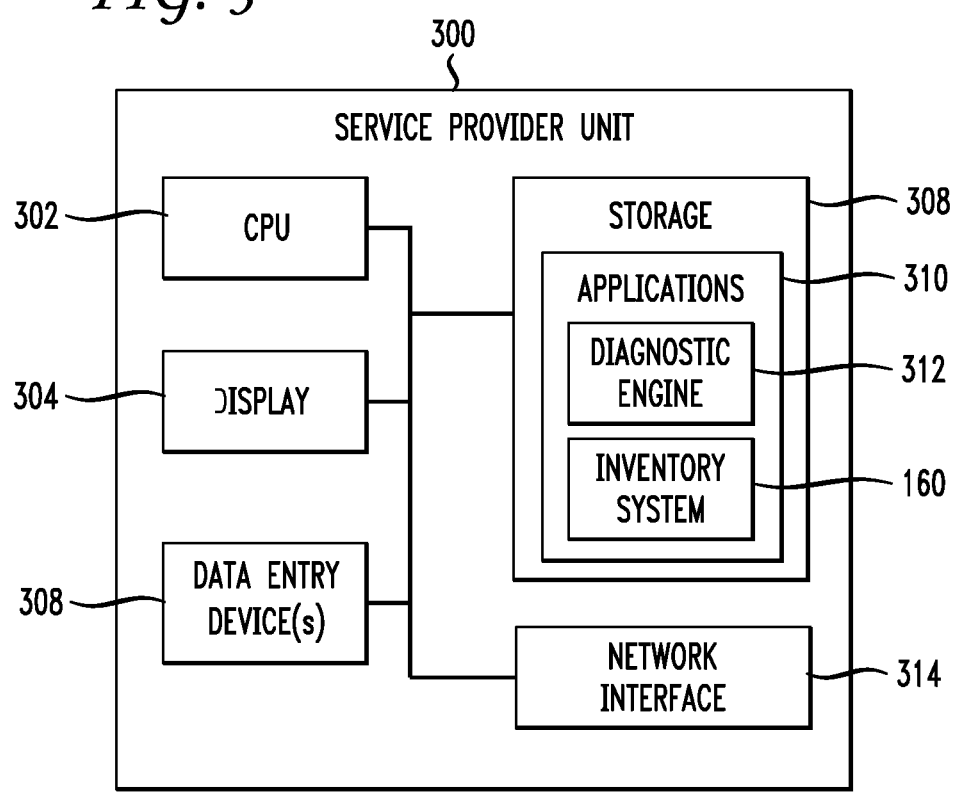
FIG. 3 is a block diagram of a service provider unit that is suitable for implementing a diagnostic engine that automatically diagnoses problems in an IPV6 dual stack network.

FIG. 3 depicts an exemplary service provider unit 300 for implementing the test and diagnostics of the dual stack network using the diagnostic engine. The service provider unit 300 can be a mainframe, personal computer (PC), laptop computer, workstation, handheld device, such as a PDA, or the like. In the illustrated embodiment, the service provider unit 300 includes a central processing unit (CPU) 302 and preferably a display device 304. The display device 304 enables the service provider unit 300 to communicate directly with an operator or technician through a visual display. The service provider unit 300 can further include data entry device (s) 306, such as a keyboard, touch screen, and/or mouse. The service provider unit 300 can include storage 308 to store data and instructions. The storage 308 can include such technologies as a floppy drive, hard drive, tape drive, Flash drive, optical drive, read only memory (ROM), random access memory (RAM), and the like. The storage 308 can be local or remote to the service provider unit 300 and can include the inventory system 150 for storing information inventory information, as well as applications 310.

Applications 310, such as the diagnostic engine 312 for detecting and diagnosing problems in the network 100 as described above can be resident in the storage 308. The diagnostic engine 312 can include instructions for implementing those embodiments depicted in FIG. 2. The service provider unit 300 preferably includes a network interface 314 for communicating with the network 100 accessing the storage 308 via a communication network, such as the network 100, when the storage 308 is implemented remotely. The CPU 302 operates to run the application in storage 308 by performing instructions therein and storing data resulting from the performed instructions, which may be presented to an operator or technician via the display 304 or by other means known to those skilled in the art, such as a printer or e-mail. The data can include a type of problem, such as a configuration error or a network error, in the network 100 so that the operator can quickl12090434
y identify and resolve the problem.

The diagnostic engine 312 enables service providers to detect and diagnose problems in a dual stack network quickly, thereby eliminating or reducing network downtimes experienced by a customer when a problem occurs. The diagnostic engine 312 can detect, diagnose, and resolve problems before the customer becomes aware of the problem and can reduce the time and labor required by an operator to find, diagnose, and resolve the problem. As a result, the service provider can provide a high quality of service while reducing costs associated with network maintenance.

It is understood that the embodiments described herein can be implemented in hardware, software, or a combination of hardware and software. For example, embodiments can be implemented using a computer system configured to execute instructions of a computer program (e.g., applications), which can control an operation of the computer system such that it carries out embodiments described herein. The computer system can include one or more computing devices (e.g., service provider units), and in some embodiments the computer system can be implemented as a distributed system of networked computing devices, where the computing device can implement portions of an application, such as the diagnostic engine, to facilitate diagnosis of problems in a dual stack network. Alternatively, a specific use computer, containing specialized hardware for carrying out embodiments can be utilized.

Terms such as applications, computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method of diagnosing a problem in a dual stack network comprising:
    maintaining, in a storage device, inventory information associated with a customer edge router in a dual stack network;
    retrieving, by a processing device, the inventory information associated with the customer edge router in response to a problem associated with the dual stack network, the inventory information including an inventoried media access control address associated with the customer edge router;
    determining, by the processing device, whether a mismatch exists between a live media access control address associated with the customer edge router and the inventoried media access control address associated with the customer edge router in response to the problem associated with the dual stack network; and
    generating, by the processing device, a notification in response to determining whether the mismatch exists, the notification including information representing a cause of the problem and a resolution of the problem.

2. The method of claim 1, further comprising determining whether an internet protocol version six address exists for the inventoried media access control address in response to retrieving the inventory information.

3. The method of claim 2, further comprising:
    checking a port status of a port on a live provider edge router associated with the customer edge router to determine whether the port is active in response to determining that the internet protocol version six address exists for the inventoried media access control address;
    performing layer 1 and layer 2 diagnostics if the port is inactive; and
    checking a live internet protocol address and network subnet mask associated with the port on the live provider edge router in response to the port being active.

4. The method of claim 1, wherein the notification includes a request for verification of the live media access control address associated with the customer edge router.

5. The method of claim 1, further comprising:
    maintaining, in the storage device, inventory information associated with a provider edge router associated with the customer edge router in the dual stack network, the inventory information including an inventoried destination media access control address associated with the provider edge router;
    retrieving, by the processing device, the inventoried destination media access control address in response to the problem associated with the dual stack network; and
    determining, by the processing device, whether a mismatch exists between a live destination media access control address associated with the provider edge router and the inventoried destination media access control address associated with the provider edge router in response to the problem associated with the dual stack network, the generating further comprising generating, by the processing device, the notification in response to determining whether the mismatch exists between the live destination media access control address and the inventoried destination media access control address.

6. The method of claim 5, wherein the notification generated in response to determining the mismatch exists between the live destination media access control address and the inventoried destination media access control address includes a warning of a possible media access control configuration problem.

7. The method of claim 5, further comprising:
retrieving policy information implemented by the provider edge router associated with the customer edge router in response to determining the mismatch between the live destination media access control address and the inventoried destination media access control address does not exist, the policy information including a packet count limit;
determining whether a packet transmitted by the customer edge router exceeds the packet count limit;
generating a notification identifying a bandwidth problem in response to the packet exceeding the packet count limit; and
performing a ping test with maximum transfer unit packets from the provider edge router to the customer edge router.

8. The method of claim 7, further comprising:
generating a notification in response to the ping test being successful, the notification indicating that no problem was found in the dual stack network; and
checking the inventoried media access control address based on an internet protocol version six address to locate customer equipment that has failed in response to a failure of the ping test.

9. The method of claim 8, further comprising retrieving the internet protocol version six address from the provider edge router.

10. The method of claim 1, wherein the inventory information is provisioned by a service provider in response to a customer network being set up and remains unchanged unless there is a change to a service agreement between the service provider and a customer associated with the customer network.

11. A computer readable device storing instructions that, when executed by a processing device, perform operations comprising:
retrieving inventory information associated with a customer edge router in a dual stack network in response to a problem associated with the dual stack network, the inventory information including an inventoried media access control address associated with the customer edge router;
determining whether a mismatch exists between a live media access control address associated with the customer edge router and the inventoried media access control address associated with the customer edge router in response to the problem associated with the dual stack network; and
generating a notification in response to determining whether the mismatch exists, the notification including information representing a cause of the problem and a resolution of the problem.

12. The computer readable device of claim 11, wherein the operations further comprise determining whether an internet protocol version six address exists for the inventoried media access control address in response to retrieving the inventory information.

13. The computer readable device of claim 12, wherein the operations further comprise:
checking a port status of a port on a live provider edge router associated with the customer edge router to determine whether the port is active in response to determining that the internet protocol version six address exists for the inventoried media access control address;
performing layer 1 and layer 2 diagnostics if the port is inactive; and
checking a live internet protocol address and network subnet mask associated with the port on the live provider edge router in response to the port being active.

14. The computer readable device of claim 11, wherein the operations further comprise:
retrieving additional inventory information maintained in the storage device, the additional inventory information being associated with a provider edge router associated with the customer edge router in the dual stack network and including an inventoried destination media access control address associated with the provider edge router;
retrieving the inventoried destination media access control address in response to the problem associated with the dual stack network; and
determining whether a mismatch exists between a live destination media access control address associated with the provider edge router and the inventoried destination media access control address associated with the provider edge router in response to the problem associated with the dual stack network.

15. The computer readable device of claim 14, wherein the operations further comprise:
retrieving policy information implemented by the provider edge router associated with the customer edge router in response to determining the mismatch between the live destination media access control address and the inventoried destination media access control address does not exist, the policy information including a packet count limit;
determining whether a packet transmitted by the customer edge router exceeds the packet count limit;
generating a notification identifying a bandwidth problem in response to the packet exceeding the packet count limit; and
performing a ping test with maximum transfer unit packets from the provider edge router to the customer edge router.

16. The computer readable device of claim 15, wherein the operations further comprise:
generating a notification in response to the ping test being successful, the notification indicating that no problem was found in the dual stack network; and
checking the inventoried media access control address based on an internet protocol version six address to locate customer equipment that has failed in response to a failure of the ping test.

17. A system to diagnose a problem in a dual stack network comprising:
a processing device; and
a storage device to store a diagnostic engine, inventory information associated with a customer edge router in a dual stack network, and instructions that, when executed by the processing device, cause the processing device to perform operations comprising:

retrieving the inventory information associated with the customer edge router from the storage device in response to a problem associated with the dual stack network, the inventory information including an inventoried media access control address associated with the customer edge router;

determining whether a mismatch exists between a live media access control address associated with the customer edge router and the inventoried media access control address associated with the customer edge router in response to the problem associated with the dual stack network; and generating a notification in response to determining whether the mismatch exists, the notification including information representing a cause of the problem and a resolution of the problem.

18. The system of claim 17, wherein the operations further comprise:

determining whether an internet protocol version six address exists for the inventoried media access control address in response to retrieving the inventory information;

checking a port status of a port on a live provider edge router associated with the customer edge router to determine whether the port is active in response to determining that the internet protocol version six address exists for the inventoried media access control address;

performing layer 1 and layer 2 diagnostics if the port is inactive; and checking a live internet protocol address and network subnet mask associated with the port on the live provider edge router in response to the port being active.

19. The system of claim 17, wherein the operations further comprise:

retrieving additional inventory information maintained in the storage device, the additional inventory information being associated with a provider edge router associated with the customer edge router in the dual stack network and including an inventoried destination media access control address associated with the provider edge router;

retrieving the inventoried destination media access control address in response to the problem associated with the dual stack network; and determining whether a mismatch exists between a live destination media access control address associated with the provider edge router and the inventoried destination media access control address associated with the provider edge router in response to the problem associated with the dual stack network.

20. The system of claim 19, wherein the operations further comprise:

retrieving policy information implemented by the provider edge router associated with the customer edge router in response to determining the mismatch between the live destination media access control address and the inventoried destination media access control address does not exist, the policy information including a packet count limit;

determining whether a packet transmitted by the customer edge router exceeds the packet count limit;

generating a notification identifying a bandwidth problem in response to the packet exceeding the packet count limit; and performing a ping test with maximum transfer unit packets from the provider edge router to the customer edge router.

* * * * *